United States Patent
Ewing

[15] 3,651,600
[45] Mar. 28, 1972

[54] HERBICIDE APPLICATOR

[72] Inventor: Bernard E. Ewing, 1717 S. Arlington Ave., Indianapolis, Ind. 46201

[22] Filed: May 14, 1970

[21] Appl. No.: 37,159

[52] U.S. Cl. ................................................47/1.5, 401/197
[51] Int. Cl. ..................................................A01c 23/00
[58] Field of Search ..............................401/197; 47/1, 1.5

[56] References Cited

UNITED STATES PATENTS

| | | | |
|---|---|---|---|
| 3,535,822 | 10/1970 | Fruth et al. | 47/1.5 |
| 3,320,694 | 5/1967 | Biron | 47/1.5 |
| 2,708,763 | 5/1955 | Jacoby | 401/197 X |

FOREIGN PATENTS OR APPLICATIONS

| | | | |
|---|---|---|---|
| 603,356 | 8/1960 | Canada | 47/1.5 |
| 604,542 | 9/1960 | Canada | 401/197 |

Primary Examiner—Robert E. Bagwill
Attorney—Trask, Jenkins & Hanley

[57] ABSTRACT

An applicator for applying a liquid herbicide to lawns comprises a hollow drum having an absorbent, herbicide-permeable covering which is fed with herbicide from a supply thereof contained within the drum. Rigid with the drum at its ends are wheels somewhat larger than the drum to maintain the absorbent covering of the drum spaced above the ground. The drum has a hollow, rigid core provided over a limited segment of its periphery with feed openings through which herbicide within the core can reach the absorbent covering. The interior of the drum is sealed against communication with the atmosphere except through the feed openings, so that when the device is not in use and the openings are disposed either wholly above or wholly below the liquid level in the ground, escape of herbicide will be prevented. An appropriate means is provided for propelling the applicator over a lawn with the wheels supporting the absorbent drum-surface spaced above the ground.

5 Claims, 5 Drawing Figures

Patented March 28, 1972 3,651,600
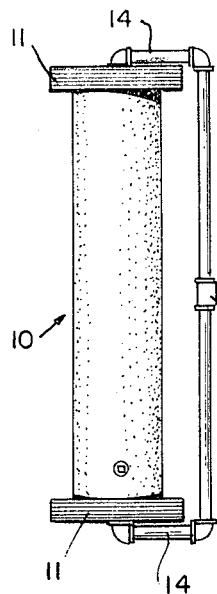
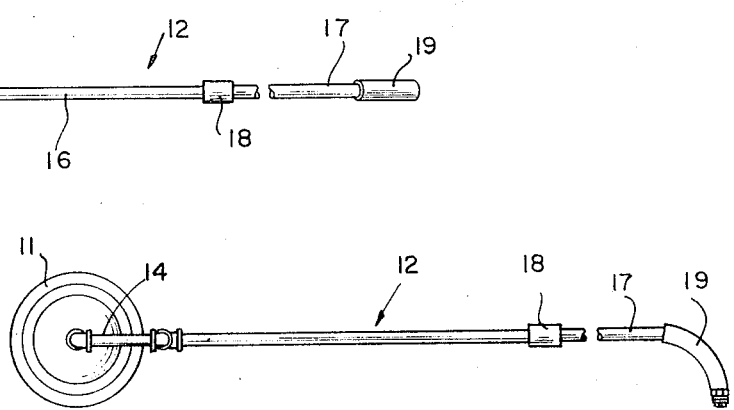
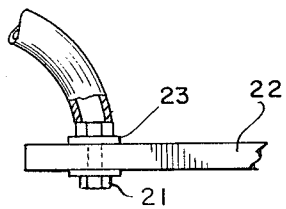
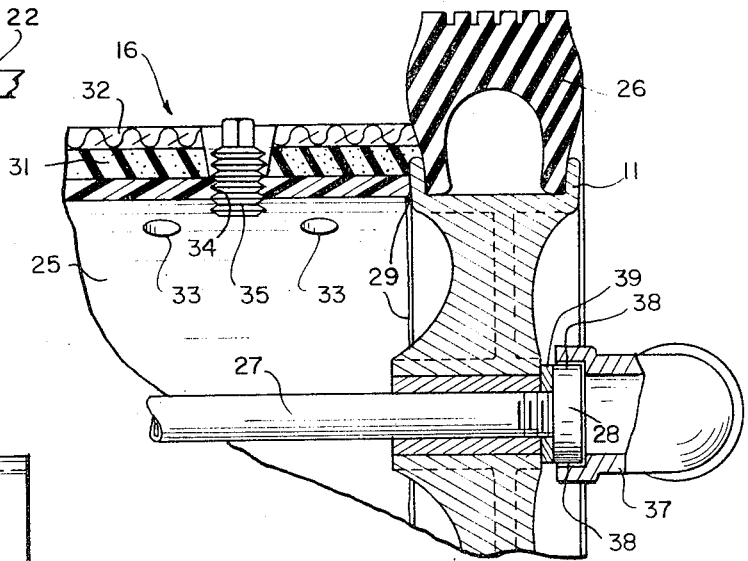
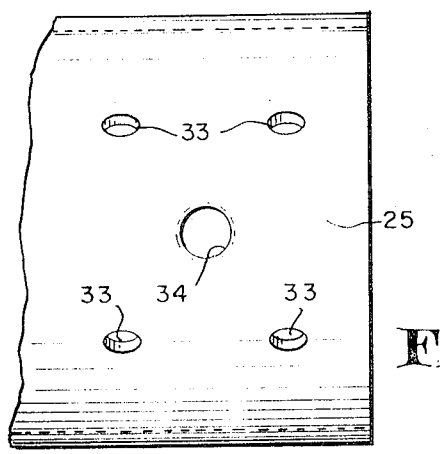
INVENTOR
BERNARD E. EWING
BY
ATTORNEY

HERBICIDE APPLICATOR

BACKGROUND OF THE INVENTION

Herbicides have heretofore been applied to lawns in a variety of ways. The use of sprayers or dusters involves a danger that the herbicide may reach vegetation which it is not desired to injure, such as flowers or decorative bushes. Solid elongated bars containing a herbicide and adapted to be drawn over the ground frequently do not distribute the herbicide evenly. In that method of application, as well as in spraying and dusting, herbicide may reach the roots of standing grass or the leaves of grass just sprouting, where its presence is usually regarded as undesirable. Another method of herbicide application, shown in my prior U.S. Pat. No. 3,021,642, involves the use of an elongated herbicide reservoir adapted for attachment to a lawn mower and having at its bottom a wick which projects downwardly and through which herbicide within the reservoir is wiped on the newly cut grass. Such an applicator has a disadvantage in that the wick is subject to undesirable wear and the further disadvantage that when the device is not in use herbicide may be lost by dripping from the wick or by evaporation from the exposed surface of the wick. There therefore has been a need for a herbicide applicator free from the disadvantages just noted, and it is the object of this invention to provide such an applicator.

SUMMARY OF THE INVENTION

An applicator in accordance with this invention embodies an elongated drum having a rigid, cylindrical core, conveniently a length of plastic pipe. Exteriorly, the core is provided with a covering of an absorbent material which is fed with herbicide from a supply within the core through feed openings provided in the core-wall. Desirably, the core is sealed against communication with the atmosphere except through those openings, which are preferably confined to a limited segment of the core-circumference. At the ends of the drum, wheels are secured thereto, such wheels having a diameter greater than that of the drum so that as the drum rolls over the surface of a lawn, the outer surface of the drum will be out of contact with the ground and the roots of the grass. A suitable means is provided for propelling the drum over the lawn, such means being preferably adapted either for propelling the device by hand or by attachment to a powered vehicle.

DESCRIPTION OF THE DRAWING

FIG. 1 is a plan view of an applicator embodying the invention;

FIG. 2 is a side elevation of the applicator;

FIG. 3 is a fragmental view similar to FIG. 2 but on a slightly enlarged scale illustrating a detail of construction;

FIG. 4 is a fragmental axial section showing, on a further enlarged scale, one end of the drum and its associated wheels; and FIG. 5 is a fragmental plan view of one end of the drum-core.

DESCRIPTION OF THE PREFERRED EMBODIMENT

The applicator shown in the drawing comprises, as major parts, a cylindrical drum 10, coaxial wheels 11 located at the ends of the drum, rigidly attached thereto, and of larger diameter than the drum, and a handle-drawbar 12 by which the applicator may be propelled over the lawn. The handle-drawbar 12 may take different forms, that shown comprising a yoke 13 having spaced arms 14 between which the drum with its wheels is rotatably mounted. The handle-drawbar shown is adapted to be constructed of pipe, conveniently ¼-inch pipe, as is also the handle-drawbar, which is removably connected to the yoke by a pipe tee 15 located centrally thereof. Conveniently, the handle-drawbar is in two parts, an inner part 16 removably received in the tee 15 and an outer part 17 removably connected to the inner part through a pipe coupling 18. At its outer end, the part 17 may be bent downwardly to provide a grip 19. If it is desired to connect the applicator to a self-propelled vehicle, the inner section 16 of the handle-drawbar may be removed and the outer section 17 attached to the tee 15 and connected at its outer end to the vehicle. For the purpose of effecting such a connection, I may employ a screw 21 which passes loosely through the drawbar 22 of the vehicle into a nut 23 welded to the end of the handle section 17.

Details of the construction of the drum 10 and its wheels are illustrated in FIGS. 4 and 5. As there shown, the drum comprises a hollow, rigid core 25, conveniently a piece of plastic pipe of about 3 inches in diameter. Each wheel 11 has a rim of a diameter such that it may abut against the adjacent end of the core, as shown in FIG. 4, and in such rim a tire 26 is mounted. The wheels are firmly secured to the ends of the core 25 by an axle 27 having threaded ends for reception in nuts 28 which, when tightened, clamp the core between the wheels. Desirably, the joint between the wheels and the core-ends are sealed with a soft cement or sealing compound 29.

As previously indicated, the core 25 bears a covering which is absorbent and permeable by a liquid herbicide. This covering may take various forms, but I prefer to use one which includes an inner layer 31 of a foamed, open-cell elastomer, such as sponge rubber, and an outer layer 32 of a napped carpet applied with its base in contact with the layer 31. The two-layer drum covering may be held in place on the core by staples (not shown).

To provide for the passage of herbicide from within the core into the absorbent drum-covering, the core is provided with a multiplicity of feed openings 33 which are preferably confined to a small segment, say 60° or less, of the core circumference. In addition to the feed openings 33, the core has a filler opening 34 provided with a removable closure, such as a pipe plug 35. Over the filler opening 34, the material of the cover 31–32 is removed to permit removal of the plug and the filling of the core. Preferably, the filler opening 34 is located within the same segment of the core as that occupied by the feed openings.

For the purpose of rotatably mounting the drum and its wheels in the yoke 13, the yoke-arms 14 are shown as terminating in inwardly directed pipe-elbows 37, the threads at the inner ends of which are removed by counterboring to provide a bearing for the nuts 28, which are circular except for diametrically opposite flats 38 provided for application of a wrench by which the nuts are tightened to clamp the wheels against the ends of the drum-core 25. Desirably, a sealing gasket 39 is provided between the nut 28 and the adjacent end of the associated wheel 11. If the nuts 38 are not too thick, the drum and wheel assembly may be removed from or replaced in the yoke 14 by merely applying a wrench or a pair of pliers to the elbow 47 and rotating it about the axis of its yoke-arm 14, the yoke having sufficient flexibility to permit such rotation of the elbow 47 as is necessary to free it from the nut 28 it normally receives.

With the plug 35 in place, the interior of the drum is sealed against communication with the atmosphere except through the feed openings 33. Accordingly, and since the openings 33 occupy only a minor portion of the circumference of the drum, storage of the applicator with the openings 33 either wholly above or wholly below the liquid level within the drum will not result in the loss of herbicide. Obviously, no such loss will occur if the openings 33 are all above such liquid level; and if they are all below such liquid level air will be prevented from entering the core and no liquid can escape therefrom.

When the applicator is to be used, the plug 35 is removed and the interior of the core filled through the opening 34, whereupon the plug 35 is replaced. Enough of the herbicide is reserved to be wiped over and thoroughly saturate the drum-covering 31–32. When the device is then propelled over the ground, the wheels and drum rotate bringing the feed openings 33 alternately to the top and bottom of the drum. When near the bottom of the drum, herbicide escapes by gravity through the openings into the covering 31–32, creating within the drum a partial vacuum which is relieved when the openings reach the top of the drum. Thus, it is possible to keep the outer covering of the drum thoroughly saturated with the herbicide.

The inner covering-layer 31, which is preferably about ¼ inch in thickness, is capable of storing a considerable quantity of herbicide in itself and serves, together with the absorbent outer layer, to distribute the herbicide received from the spaced feed openings 33 evenly to the outer surface of the drum. The tires 26 have a diameter substantially larger than the external diameter of the drum so that, as the device rolls over a lawn, the herbicide-saturated drum-surface is maintained out of contact with the ground, grass roots and newly sprouting grass, and the herbicide is applied by contact to only the upper portion of the standing grass-leaves. Best results are obtained in most cases if the diameter of the tires is about two inches greater than the diameter of the drum.

I claim:

1. A herbicide applicator adapted to apply a liquid herbicide to lawns, comprising a cylindrical drum having a rigid, tubular core closed at its ends for containing a supply of the herbicide, said core having a porous herbicide permeable covering forming the exterior cylindrical surface of the drum said covering having an inner layer of foamed, open-cell elastomer and an outer layer of an absorbent fabric, said core having a multiplicity of axially distributed feed openings through which herbicide within the core can escape outwardly to saturate said covering; ground engaging wheels for supporting the drum with its outer surface spaced above the ground, at least one of said wheels being drivingly connected to said drum to rotate the same, and means for propelling the applicator over the ground, said feed openings all being located within a minor segment of the core's circumference, whereby when the drum is disposed in a position with the holes upward, the drum will retain the liquid against escape.

2. An applicator according to claim 1 wherein the circumferential wall of said core is provided with a filler opening having a removable closure, said filler opening being located within the segment of the core occupied by said herbicide passing the openings.

3. An applicator according to claim 1 with the addition that the herbicide-containing space within the core is sealed against the passage of air except through openings in said minor segment.

4. An applicator according to claim 1 wherein said propelling means comprises a yoke having spaced arms between which the drum with its wheels is journaled and a drawbar extending from the center portion of said yoke and having a laterally projecting handle grip, said drawbar terminating in means for connecting the same to a self-propelled vehicle.

5. An applicator according to claim 1 wherein said covering comprises an inner layer of foamed, open-cell elastomer and an outer layer of napped carpeting.

* * * * *